United States Patent
Teetzel et al.

(10) Patent No.: US 9,243,870 B2
(45) Date of Patent: Jan. 26, 2016

(54) MOUNTING APPARATUS FOR NIGHT VISION SYSTEM

(71) Applicant: Wilcox Industries Corp., Newington, NH (US)

(72) Inventors: James W. Teetzel, Portsmouth, NH (US); Ned A. Dalzell, Portsmouth, NH (US); Nathaniel G. Wright, Rye, NH (US)

(73) Assignee: Wilcox Industries Corp., Newington, NH (US)

( * ) Notice: Subject to any disclaimer, the term of this patent is extended or adjusted under 35 U.S.C. 154(b) by 0 days.

(21) Appl. No.: 14/282,461

(22) Filed: May 20, 2014

(65) Prior Publication Data

US 2014/0345181 A1 Nov. 27, 2014

Related U.S. Application Data

(60) Provisional application No. 61/826,806, filed on May 23, 2013.

(51) Int. Cl.
*F41G 1/38* (2006.01)
*F41G 11/00* (2006.01)
*G02B 23/12* (2006.01)

(52) U.S. Cl.
CPC ............ *F41G 11/003* (2013.01); *G02B 23/125* (2013.01); *F41G 11/001* (2013.01)

(58) Field of Classification Search
CPC ............ F41C 27/00; F41G 1/32; F41G 1/34; F41G 1/36; F41G 1/38; F41G 1/387; F41G 11/00; F41G 11/001–11/008; F16L 3/00; F16L 3/02; F16L 3/10
See application file for complete search history.

(56) References Cited

U.S. PATENT DOCUMENTS

| | | | |
|---|---|---|---|
| 3,877,166 A * | 4/1975 | Ward | 42/127 |
| 3,908,950 A * | 9/1975 | Apel | 248/291.1 |
| 4,205,473 A * | 6/1980 | Wilson | 42/127 |
| D269,450 S * | 6/1983 | Bechtel | D22/110 |
| 4,562,658 A * | 1/1986 | Govett | 42/125 |
| 4,574,508 A * | 3/1986 | Ross | 42/124 |
| 5,272,514 A * | 12/1993 | Dor | 356/251 |
| 5,787,630 A * | 8/1998 | Martel | 42/125 |
| 5,816,683 A * | 10/1998 | Christiansen | 362/110 |
| 6,023,875 A * | 2/2000 | Fell et al. | 42/146 |

(Continued)

OTHER PUBLICATIONS

U.S. Appl. No. 14/242,303, filed Apr. 1, 2014.

*Primary Examiner* — Bret Hayes
*Assistant Examiner* — Derrick Morgan
(74) *Attorney, Agent, or Firm* — McLane Middleton, Professional Association

(57) ABSTRACT

An improved weapon mount system for night vision system includes a cage-like structure receiving the body of a night vision system, such as a night vision monocular. A mounting shoe is attached to the base and cage halves secure the body of the night vision system. The mounting shoe of the present mount provides a lower profile than an integral mounting member on the night vision system that is used to attach the night vision system to a helmet/head worn mount. In one aspect, by lowering the weapon mounting height of the night vision device, the night vision system can be mounted at an appropriate height for use in front of an optical scope. In another aspect one aspect, lowering the weapon mounting height of the night vision device allows the night vision system to be mounted at an appropriate height for use on a helmet mounting system in a binocular system having a thermal camera or other type of viewing device.

32 Claims, 10 Drawing Sheets

(56) References Cited

U.S. PATENT DOCUMENTS

| | | | |
|---|---|---|---|
| 6,295,754 B1 * | 10/2001 | Otteman et al. | 42/124 |
| 7,219,370 B1 * | 5/2007 | Teetzel et al. | 2/6.2 |
| 7,272,904 B2 * | 9/2007 | Larue | 42/127 |
| 7,685,759 B2 | 3/2010 | Teetzel | |
| 7,882,654 B1 * | 2/2011 | Marcum et al. | 42/90 |
| 8,156,679 B1 * | 4/2012 | Swan | 42/124 |
| 8,186,093 B1 * | 5/2012 | Chung | 42/113 |
| D697,576 S * | 1/2014 | Swan et al. | D22/109 |
| 8,726,562 B1 * | 5/2014 | Hoskisson | 42/135 |
| 8,793,921 B1 * | 8/2014 | Tonello et al. | 42/125 |
| 8,935,875 B2 * | 1/2015 | Collin et al. | 42/90 |
| 2006/0026888 A1 * | 2/2006 | Cheng et al. | 42/146 |
| 2006/0123686 A1 * | 6/2006 | Larue | 42/127 |
| 2006/0162227 A1 * | 7/2006 | Samson | 42/148 |
| 2007/0044365 A1 * | 3/2007 | Deken | 42/146 |
| 2007/0068058 A1 * | 3/2007 | Remo | 42/122 |
| 2008/0061202 A1 * | 3/2008 | Costabel et al. | 248/230.7 |
| 2008/0148619 A1 * | 6/2008 | Rogers et al. | 42/90 |
| 2009/0288328 A1 * | 11/2009 | Kiser | 42/124 |
| 2010/0011647 A1 * | 1/2010 | Faifer | 42/90 |
| 2010/0043271 A1 * | 2/2010 | Williams et al. | 42/124 |
| 2010/0229450 A1 * | 9/2010 | Becker et al. | 42/90 |
| 2011/0192068 A1 * | 8/2011 | Samson et al. | 42/90 |
| 2011/0197490 A1 * | 8/2011 | Ziegler | 42/124 |
| 2011/0296732 A1 * | 12/2011 | Carlson et al. | 42/90 |
| 2011/0310476 A1 * | 12/2011 | Russ | 359/412 |
| 2011/0314720 A1 * | 12/2011 | Cheng | 42/117 |
| 2012/0159831 A1 * | 6/2012 | LaFrance et al. | 42/90 |
| 2012/0167441 A1 * | 7/2012 | Holmberg | 42/119 |
| 2012/0291331 A1 * | 11/2012 | Troy et al. | 42/124 |
| 2012/0311909 A1 * | 12/2012 | Cheng | 42/90 |
| 2013/0036650 A1 * | 2/2013 | Larue | 42/148 |
| 2013/0104441 A1 * | 5/2013 | Kincel et al. | 42/90 |
| 2013/0185979 A1 * | 7/2013 | Fridley | 42/90 |
| 2013/0240733 A1 * | 9/2013 | Plotsker | 250/338.1 |
| 2013/0318852 A1 | 12/2013 | Teetzel et al. | |
| 2014/0123532 A1 * | 5/2014 | Russ | 42/113 |
| 2014/0137457 A1 * | 5/2014 | Collin et al. | 42/90 |
| 2014/0196349 A1 * | 7/2014 | Rogers et al. | 42/90 |
| 2014/0327962 A1 * | 11/2014 | Teetzel et al. | 359/409 |
| 2015/0000172 A1 * | 1/2015 | Oglesby | 42/90 |

* cited by examiner

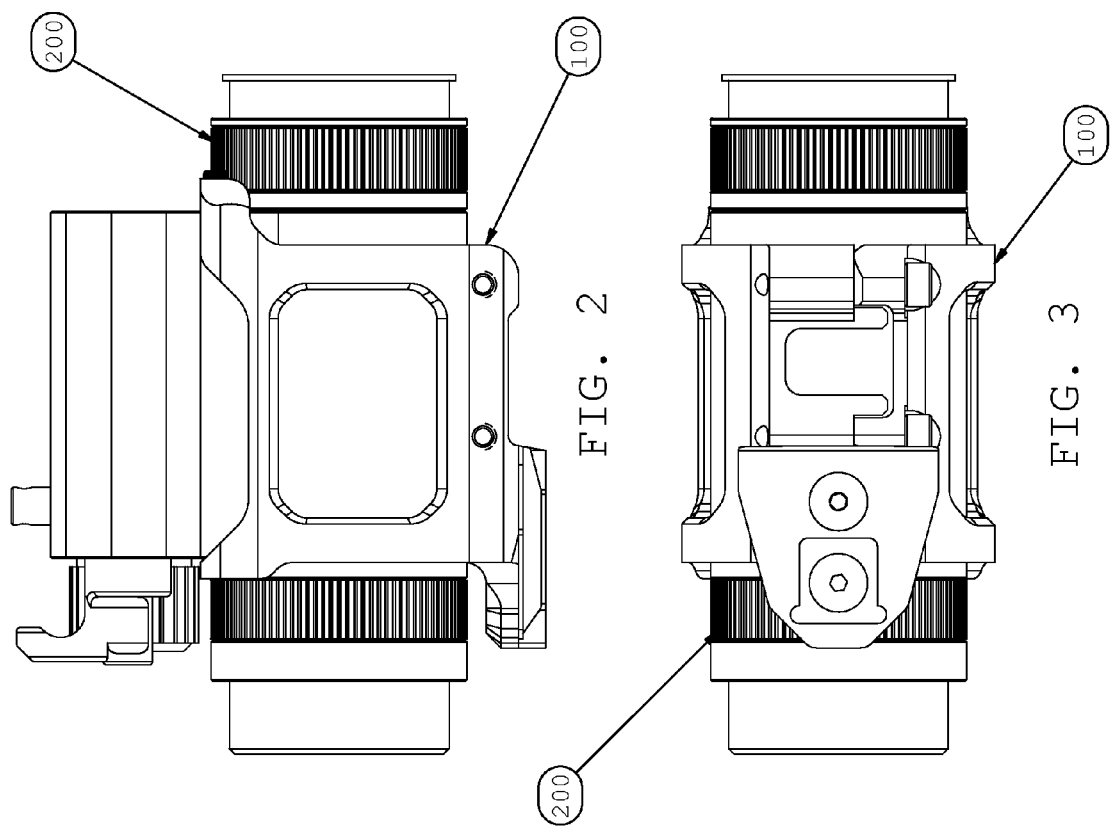

MOUNTING APPARATUS FOR NIGHT VISION SYSTEM

CROSS REFERENCE TO RELATED APPLICATION

This application claims the benefit of provisional application Ser. No. 61/826,806 filed May 23, 2013. The aforementioned application is incorporated by reference in its entirety.

BACKGROUND

The present disclosure relates to an improved mounting adaptor for a night vision system. The illustrated preferred embodiment is adapted for use with the MINI N/SEAS night vision monocular available from ITL Optronics Ltd. of Petah Tikva, Israel. It will be recognized that the present development could be adapted for use with other commercially available night vision systems.

Night vision systems employ image intensifier tubes to allow users to visualize a scene under nighttime or other low light conditions. Night vision systems can be employed in a variety of configurations, including mounted on a helmet or other head mount, mounted on a weapon accessory rail, and others.

The image intensifier tube is mounted in a housing which also houses a power supply and electronics. Commonly, the night vision system includes an integral mounting receptacle for removable attachment to a mounting shoe on a helmet mount of a helmet or other headgear for supporting the night vision system in front of an eye of the user. Also, weapon accessory rail clamps having a mounting shoe are also known, which allow the user to removably attach a night vision system onto a firearm or other weapon, e.g., in front of an optical scope.

Although rail clamps that accept a night vision device for weapon mounting are known, often the integral mounting receptacle of the prior art night vision systems is positioned such that the optical axis of the night vision system is not aligned with the optical axis of an attached scope, resulting in misalignment. For example, in the case of the MINI N/SEAS night vision system, use of the integral mounting receptacle with a weapon rail clamp results in the optical axis of the night vision system being higher than the optical axis of the weapon mounted scope.

The present development provides an improved mounting adapter that overcomes the above referenced problems and others.

SUMMARY

In one aspect, a mounting apparatus for mounting a night vision system of a type having an elongated housing and a first mounting fastener on the housing comprises a first shell member having a first base portion and a first generally upstanding side portion. A second shell member has a second base portion removably attached to the first base portion to define a bottom end and a second generally upstanding side portion which is spaced apart from and opposing the first generally upstanding side portion. A second mounting fastener is attached to an exterior surface of the bottom end. The first shell member and the second shell member cooperate to define a compartment for receiving the elongated housing, the compartment having an open top opposite the bottom end, the open top configured to allow a protruding portion of the elongated housing having the first mounting fastener to protrude from the compartment.

In a further, more limited aspect, the first mounting fastener is a mounting receptacle.

In a further, more limited aspect, the second mounting fastener is a mounting shoe.

In a further, more limited aspect, the mounting shoe has a generally dovetail shape.

In a further, more limited aspect, the mounting apparatus further comprises one or more threaded fasteners for removably securing the first base portion to the second base portion.

In a further, more limited aspect, the first base portion and the second base portion each have a complementary keyed feature for interlocking the first base portion to the second base portion.

In a further, more limited aspect, the first base portion includes a protuberance which extends into a complementary recess on the second base portion.

In a further, more limited aspect, the mounting apparatus further comprises a first front retention tab attached to a distal end of the first generally upstanding side portion and extending toward the second upstanding side portion. A second front retention tab is attached to a distal end of the second generally upstanding side portion and extending toward the first upstanding side portion. A first rear retention tab is attached to a distal end of the first generally upstanding side portion and extending toward the second upstanding side portion. A second rear retention tab is attached to a distal end of the second generally upstanding side portion and extending toward the first upstanding side portion. The first front retention tab and the first rear retention tab are disposed at opposite axial ends of the first generally upstanding side portion. The second front retention tab and the second rear retention tab are disposed at opposite axial ends of the second generally upstanding side portion. The first front retention tab and the second front retention tab are configured to bear against a forward facing surface of the protruding portion of the elongated housing. The first rear retention tab and the second rear retention tab are configured to bear against a rearward facing surface of the protruding portion of the elongated housing.

In a further, more limited aspect, at least one of the first front retention tab and the first rear retention tab includes a first set screw rotatably received within a first threaded opening, and at least one of the second front retention tab and the second rear retention tab includes a second set screw rotatably received within a second threaded opening.

In a further, more limited aspect, the mounting apparatus of claim 1, further comprises a rail clamp having a clamping member configured to be removably attached to a firearm accessory rail coupled to a third mounting fastener removably attachable to the second mounting fastener.

In a further, more limited aspect, the rail clamp has a first height, the base portion has a second height, and the first and second heights cooperate to position an optical axis of the night vision system at a desired height above the accessory rail when night vision system is received in compartment, when the second mounting fastener is attached to the third mounting fastener, and when the rail clamp is attached to the accessory rail.

In a further, more limited aspect, the mounting apparatus further comprises the night vision system.

In a further, more limited aspect, wherein the night vision system is a MINI N/SEAS night vision monocular.

In a further, more limited aspect, the protruding portion of the elongated housing has a third height which is greater than the desired height.

In a further, more limited aspect, the desired height is substantially equal to a fourth height, the fourth height equal to a height above the accessory rail of an optical axis of an optical device mounted to the accessory rail.

In a further, more limited aspect, the third mounting fastener is pivotally attached to the clamping member, the third mounting fastener pivotable between an operative position wherein the night vision system is in optical alignment with the optical device mounted to the accessory rail and a non-operative position, wherein the night vision system is moved out of optical alignment with the optical device mounted to the accessory rail.

In a further, more limited aspect, the third mounting fastener is pivotally attached to the clamping member, the third mounting fastener pivotable between an operative position and a non-operative position.

In a further, more limited aspect, the second mounting fastener is configured to be attached to a helmet mount of a type configured to support the night vision system before an eye of a user.

In a further, more limited aspect, the base portion has a height selected to suspend the night vision system at a desired vertical position beneath the helmet mount.

In a further, more limited aspect, the height is selected so that an optical axis of the night vision system attached to the helmet mount will be at substantially the same vertical position beneath the helmet mount as an optical axis of an adjacent attached viewing device attached to the helmet mount.

In a further, more limited aspect, the adjacent attached viewing device is a thermal camera.

BRIEF DESCRIPTIONS OF THE DRAWINGS

FIG. 2 is an enlarged side view of the weapon mount system and night vision monocular.

FIG. 3 is a bottom view of the weapon mount system and night vision monocular.

Figure 11:
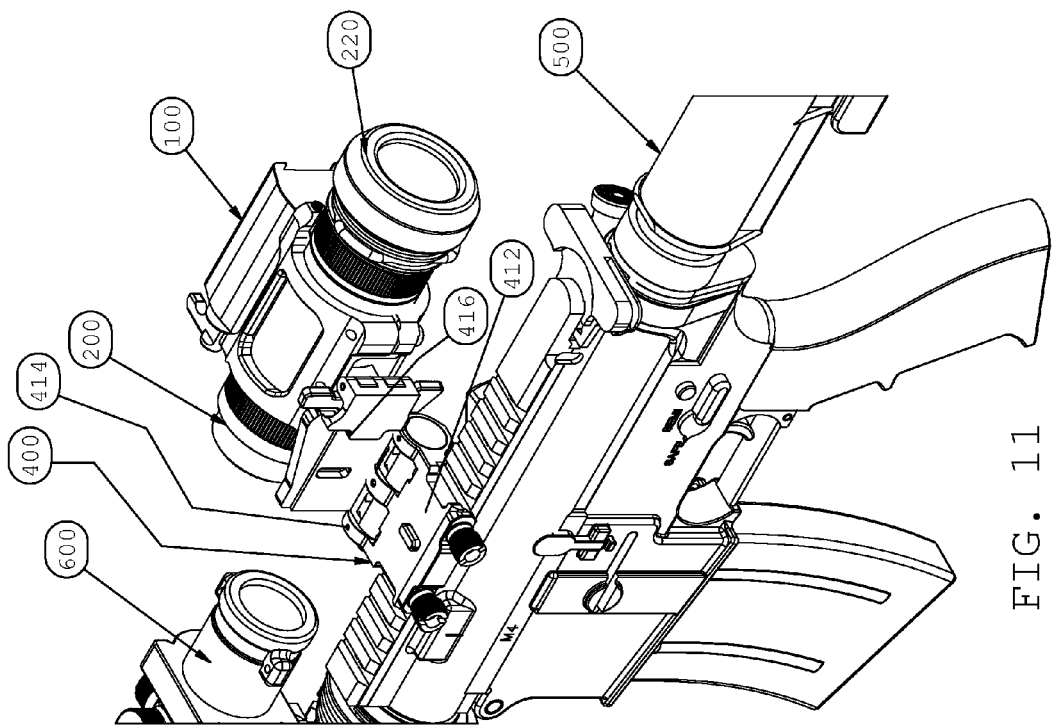

FIG. 11 an isometric view of illustrating the weapon mount system herein with a night vision monocular mounted on a weapon and pivoted out of optical alignment with a weapon scope when not in use.

Figure 12:
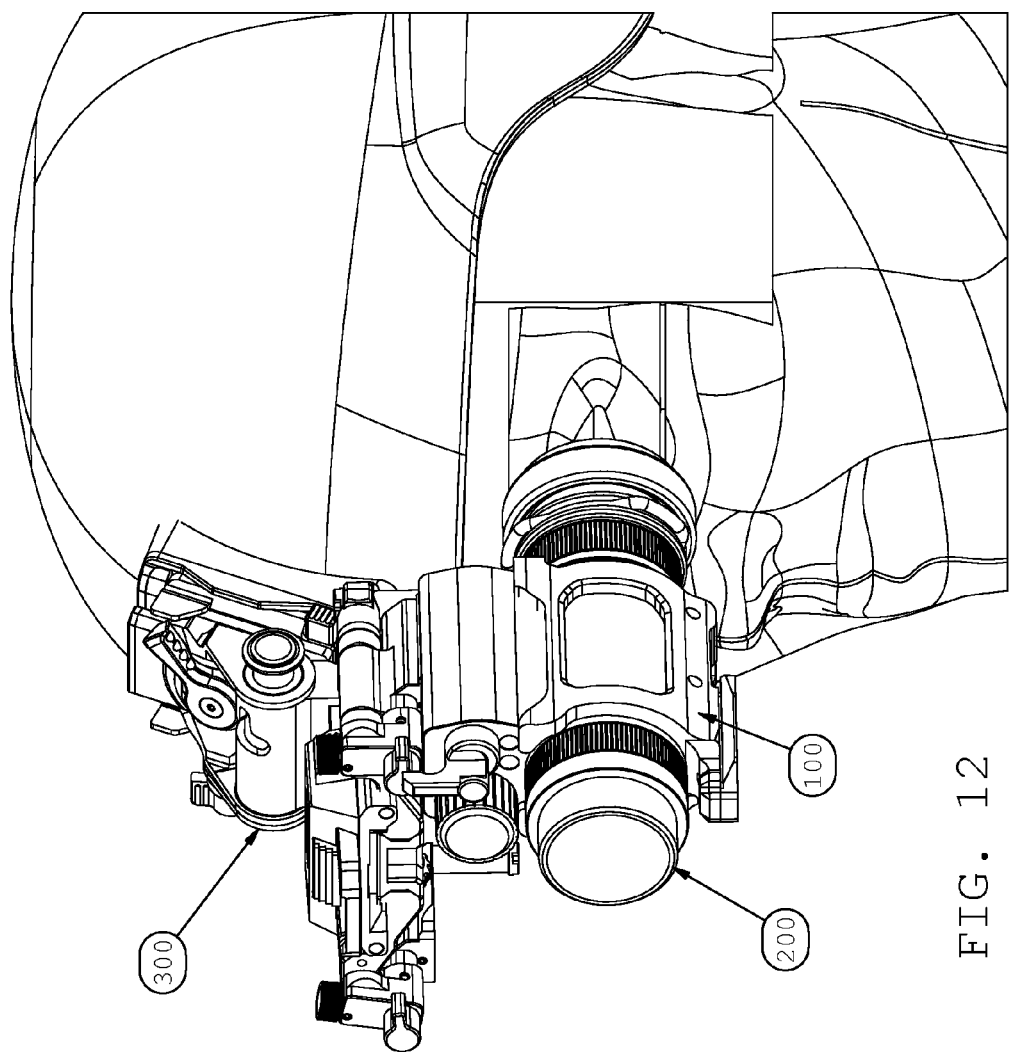

FIG. 12 is an isometric view illustrating the manner of connecting the night vision monocular to a helmet mounting system.

Figure 13:
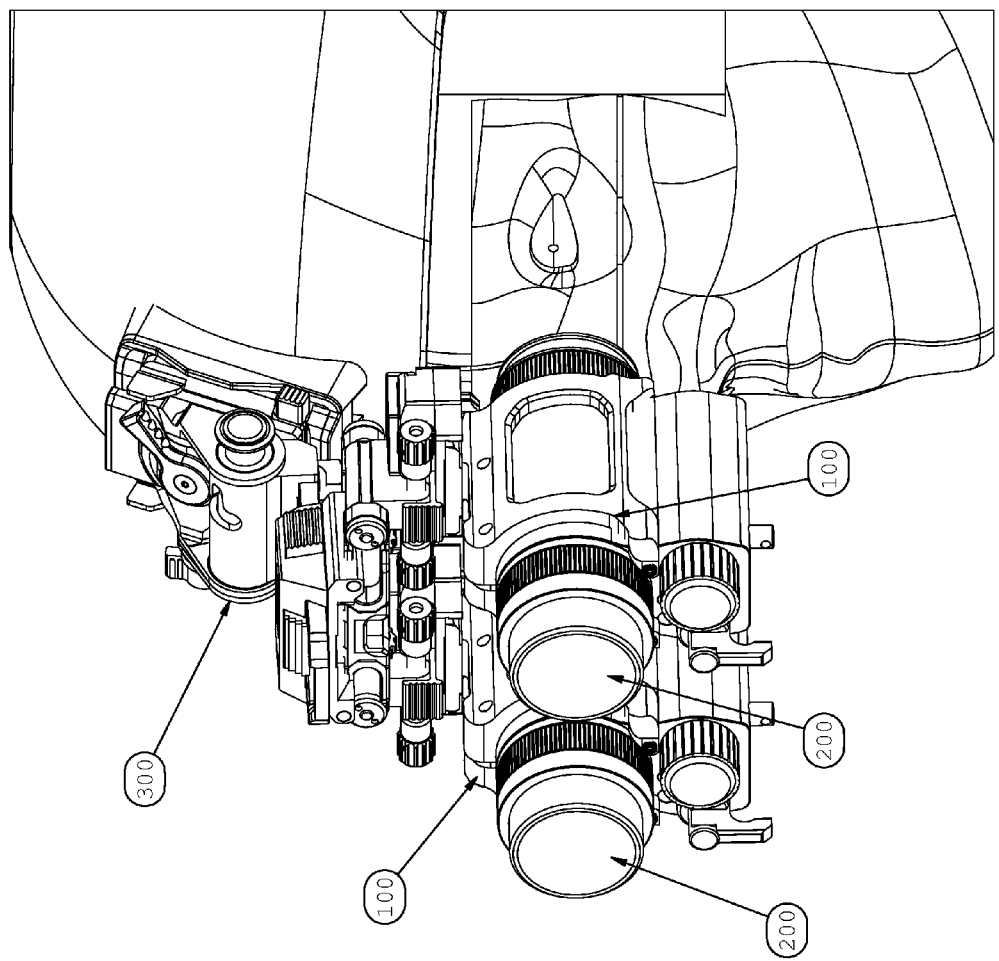

FIG. 13 is an isometric view of illustrating two night vision monocular devices attached to a helmet mounting system to provide a binocular night vision system.

Figure 14:
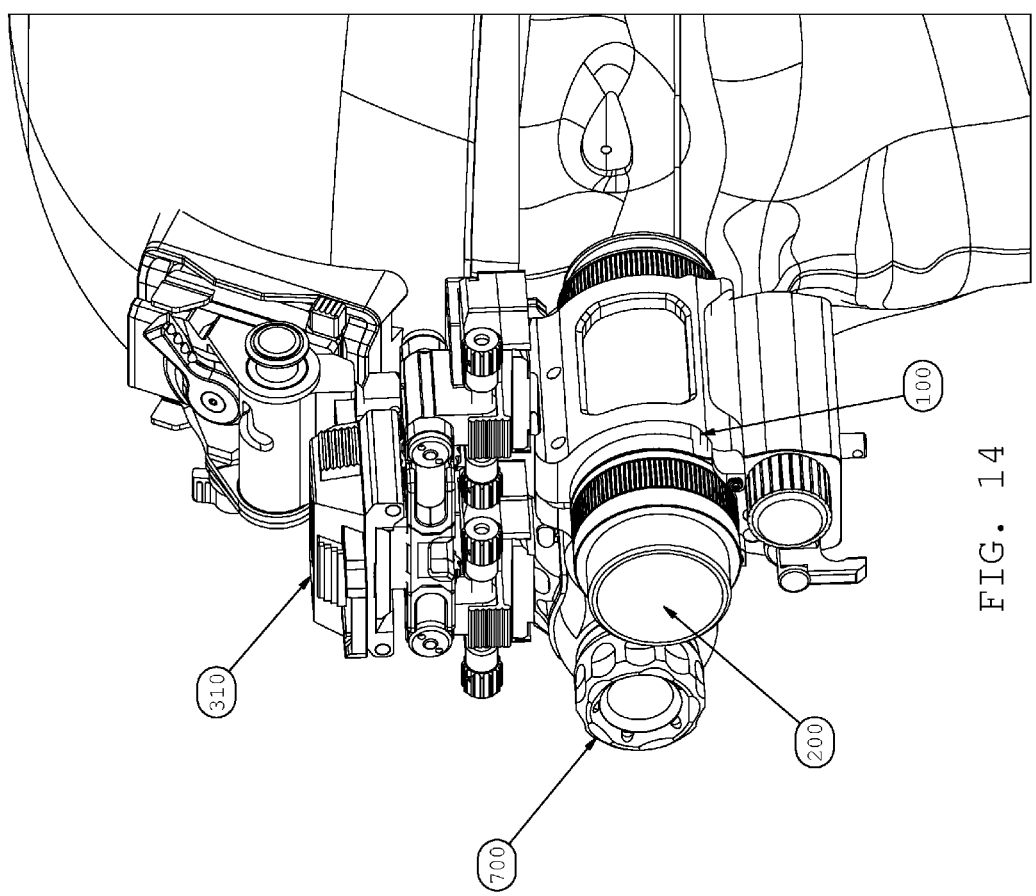

FIG. 14 is an isometric view illustrating a vision system including a night vision monocular device combined with a different viewing device such as a thermal camera to provide a binocular viewing system with different viewing or imaging modalities.

DETAILED DESCRIPTION OF THE PREFERRED EMBODIMENT(S)

Referring to the drawings, where like reference numerals refer to like components throughout the several views, a mounting adapter system 100 includes a cage-like structure receiving the body of a night vision system 200, which allows the night vision system to be selectively and removably secured to a rail clamp 400 attached to a weapon or firearm 500. When removed from the rail clamp 400, the night vision system 200 can be removably secured to a helmet mount 300 (see FIG. 12) using an integral or preexisting mounting member 212 on the night vision system 200 housing. Alternatively, when removed from the rail clamp 400, the night vision system 200 can be removably secured to a helmet mount 310 (see FIGS. 13 and 14) using mounting fastener 140 on the adapter system 100.

The mounting system 100 has a generally cage-like structure and includes a left shell half 110 and a right shell half 112. The left shell half 110 includes a base portion 114 and a generally upstanding portion 116. The right shell half 112 includes a base portion 118 and a generally upstanding portion 120.

The base portion 114 is secured to the base portion 118 via threaded fasteners 122 that pass through openings 124 in the base portion 118 and rotatably engage threaded openings 126 in the base portion 114. The joint between the base portions 114, 118 is preferably keyed and/or asymmetric or off center to provide a fastening structure 138*a*, 138*b* which allows attaching the shoe 140 along a longitudinal center line on the base. The base portions 114 and 118 cooperate to define a bottom end of the adapter 100.

The body 210 of the night vision system 200 is captured on opposite transverse sides by the upstanding portions 116, 120. The upstanding portions 164, 120 may be curved or otherwise shaped to conform to the exterior shape of the night vision system body 210.

Front tabs 130*a*, 130*b* are located at the forward end of the upstanding portions 110, 112, respectively. Rear tabs 132*a*, 132*b* are located at the rearward end of the upstanding portions 116, 120, respectively. The tabs 130*a*, 130*b*, 132*a*, 132*b* extend inwardly and engage the corresponding forward and rearward facing surfaces 232, 234, respectively, of a protruding portion 236 of the night vision system 200, which extends out of the open top end of the adapter system 100. The tabs 130*a*, 130*b* 132*a*, 132*b* prevent axial movement of the night vision system 200 relative to the cage structure 100.

The rearward tabs 132*a*, 132*b* each have a respective threaded opening 134*a*, 134*b*, each receiving a set screw 136. The set screws 136 are tightened to bear against the housing of the night vision system 200 to adjust the tolerance between the night vision system 200 and the upstanding members 116, 120.

A mounting shoe 140 is attached to the base member 114 via threaded fasteners 142 passing through openings 144 in the shoe 140 and engaging threaded openings 146 in the base member 114.

Access to the integral or preexisting mounting member 212, e.g., a dovetail slot, on the night vision system 200 is not affected by the cage system 100 and remains available for attaching the night vision system 200 to the mounting shoe of a helmet/headgear mount 300 using the integral receptacle 212, with the system 100 in place, as shown in FIG. 12.

Figure 10:
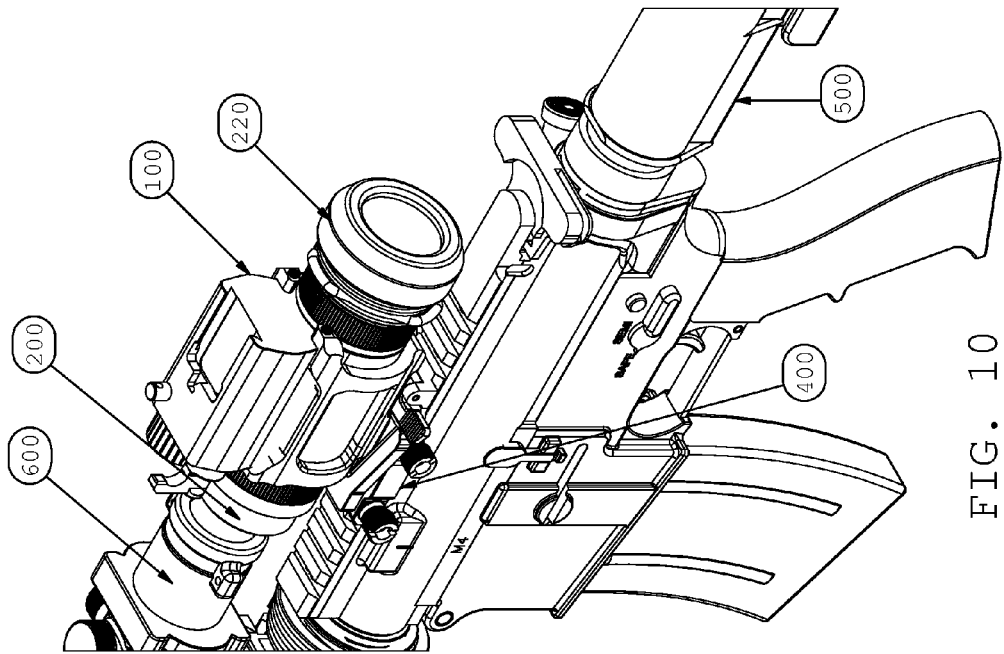
FIG. 10 is an isometric view of illustrating the weapon mount system herein with a night vision monocular mounted on a weapon in optical alignment with a weapon scope.

Likewise, the ends of the unit 200 remain available when the mounting system 100 is attached, allowing the user to attachment of supplemental or replacement optics, such as a light reducing filter 220 (see FIGS. 10 and 11) over the eyepiece end 222 of the unit 200, and others, such as replacement eyepieces, lenses (not shown) that mount to or replace the objective lens 224, etc.

Figure 9:
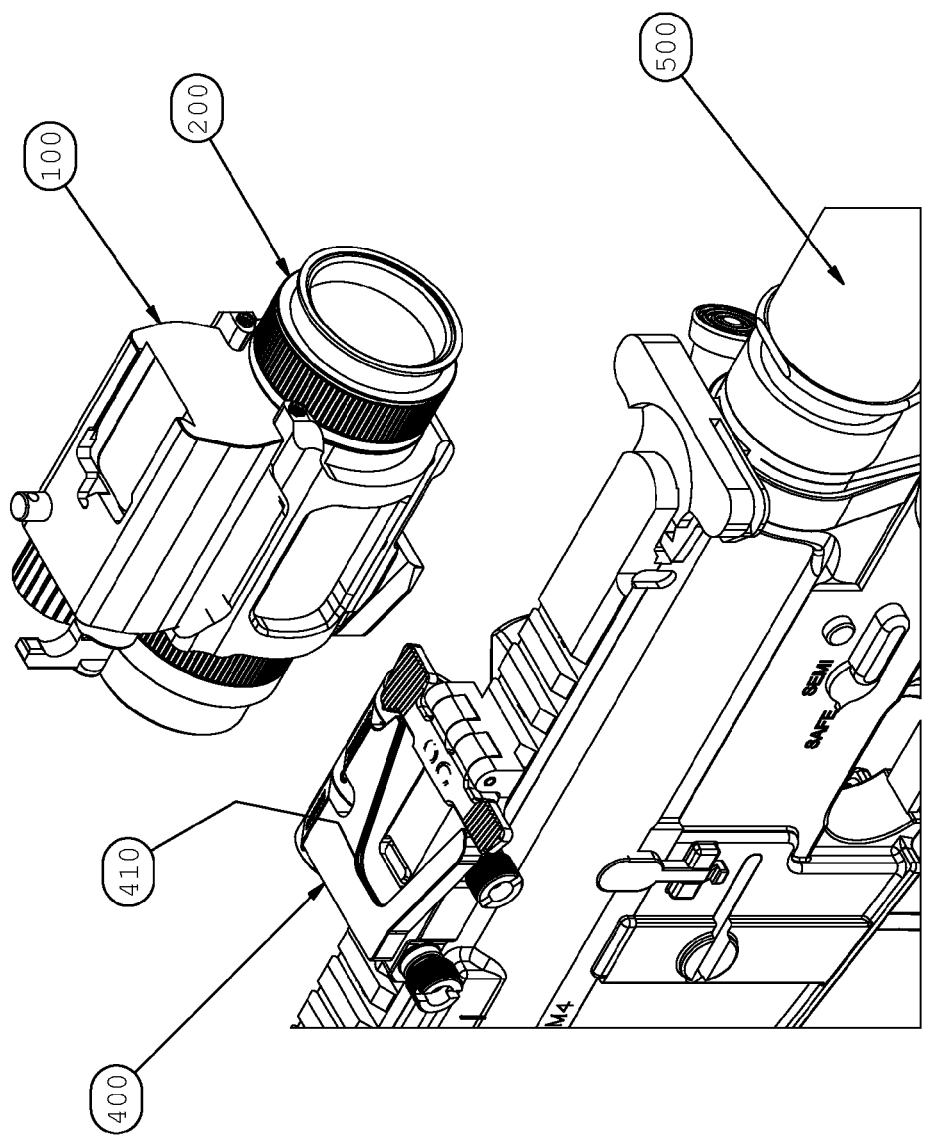
FIG. 9 is an isometric view illustrating the manner of attaching the weapon mount system herein to a rail clamp.

To use the night vision system 200 on a weapon accessory rail, the unit 200 is removed from the helmet mount 300 and the mounting shoe 140 is removably attached to the rail clamp 400 using the shoe 140 As illustrated in FIG. 9, the rail clamp 400 is attached to an accessory mounting rail 510, which may a MIL-STD-1913/Picatinny rail, STANAG 2324 rail, STANAG 4694 rail, or the like. Other types of accessory mounting rails are also contemplated. The clamp 400 includes a mounting shoe receptacle 410 which slidably receives the shoe 140 of the mounting system 100. In certain embodiments, the vertical dimension or height of the rail clamp 400 above the accessory rail 510 and/or the vertical thickness of the base members 114, 118 defining the bottom end can be selected for a given night vision system so that the optical axis 214 of the night vision system 200 is a desired height H above the surface of the rail 510 when mounted.

The height H is selected so that the optical axis 214 of the device 200 is in substantial alignment with an optical axis of another optical viewing or sighting device 600 positioned in front of the night vision device 200 with which the night vision system 200 is to be used. In preferred embodiments, the height H is selected to be equal to a common or industry standard optical sight mounting height to allow the night vision system 200 to be aligned with a variety of optical scopes and sights. In especially preferred embodiments, the height H is selected to be 1.52 inches. In contrast, the use of integral mounting member 212 on the night vision device 200 without the adapter system 100 may not allow the night vision device 200 to be used behind an optical scope, e.g., because the night vision device 200 may not have a sufficiently low profile to allow for use with a scope when mounted on a weapon. For example, in the illustrated embodiment, the integral or preexisting mounting member 212 is disposed on a battery compartment portion 226 of the unit 200, rendering the optical axis 214 too high for use with a typical or conventional rail mounted scope or sight. Access to the integral or preexisting mounting member 212 is not affected by the cage system 100 and remains available for attaching the night vision system 200 to an appropriate clamping rail having a complimentary mounting fastener (not shown) if desired without the need to remove the adapter system 100.

Figure 1:
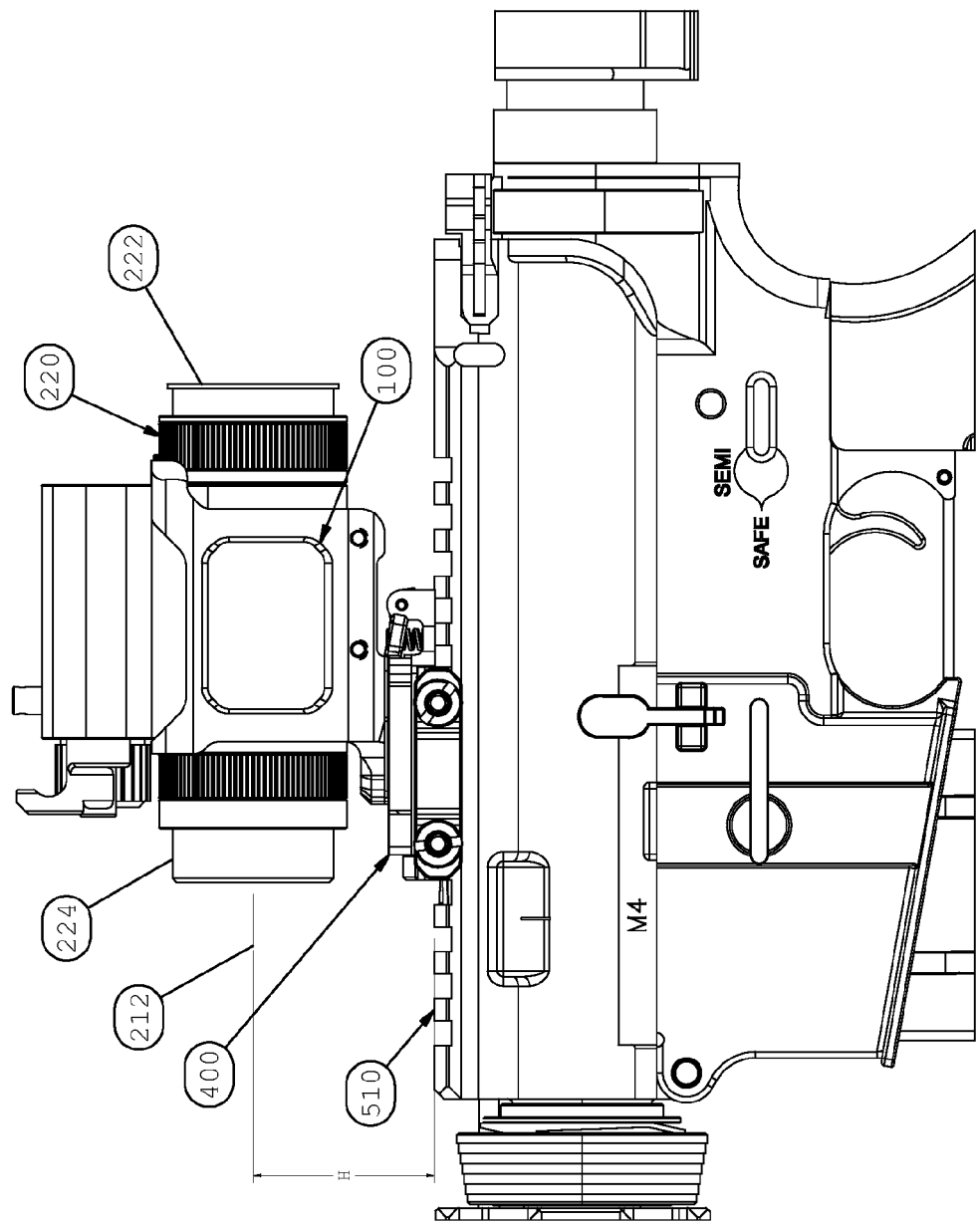
FIG. 1 is a side view of an exemplary embodiment weapon mount system herein employed with a night vision monocular and mounted on a weapon accessory rail clamp.
Figure 4:
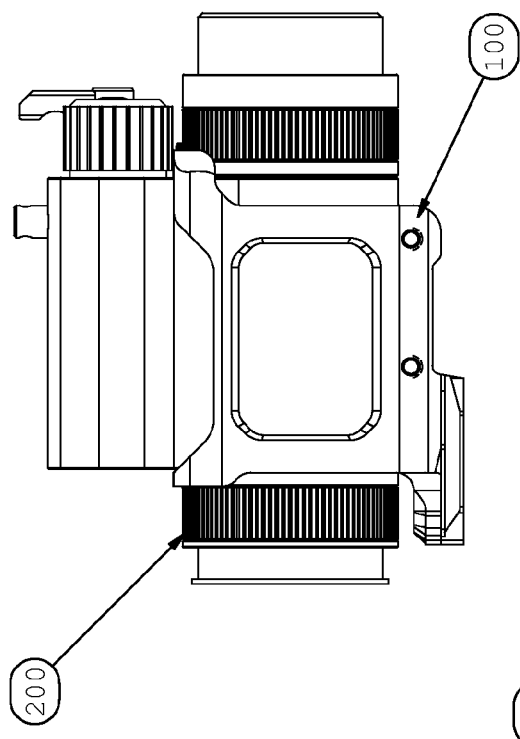
FIGS. 4 and 5 are side views illustrating the manner in which the weapon mount adapter herein can be reversed.
Figure 5:
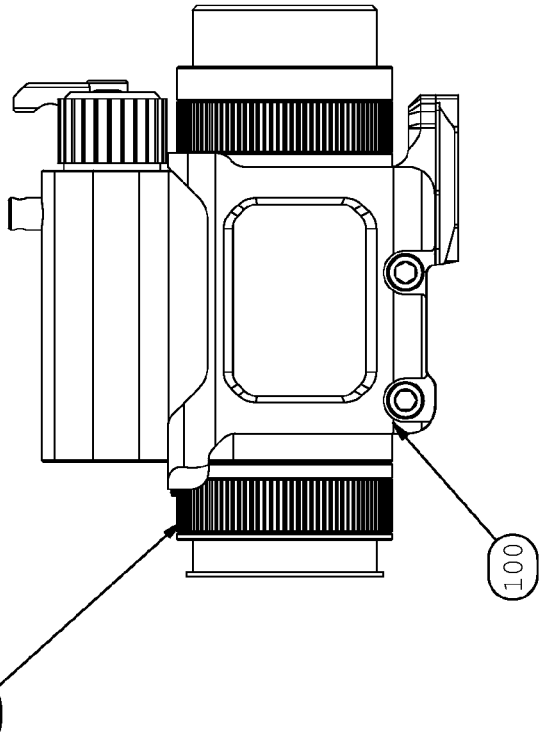
Figure 7:
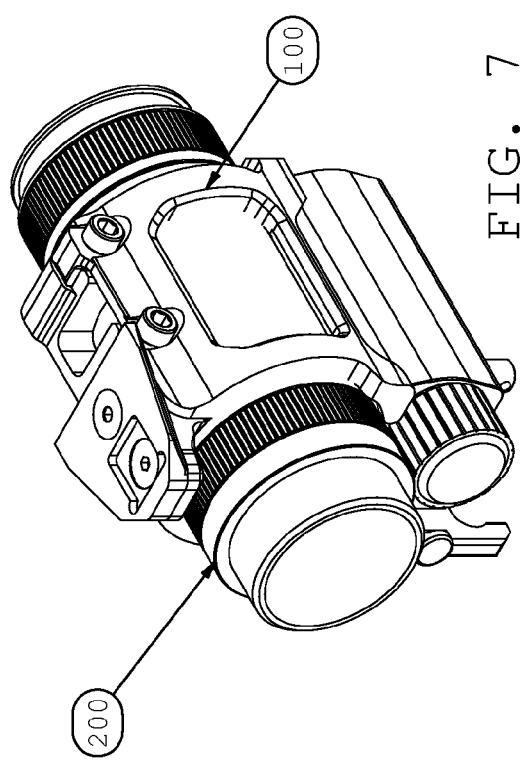
FIG. 7 is an isometric view of the weapon mount system and night vision monocular taken generally from the bottom and front.
Figure 6:
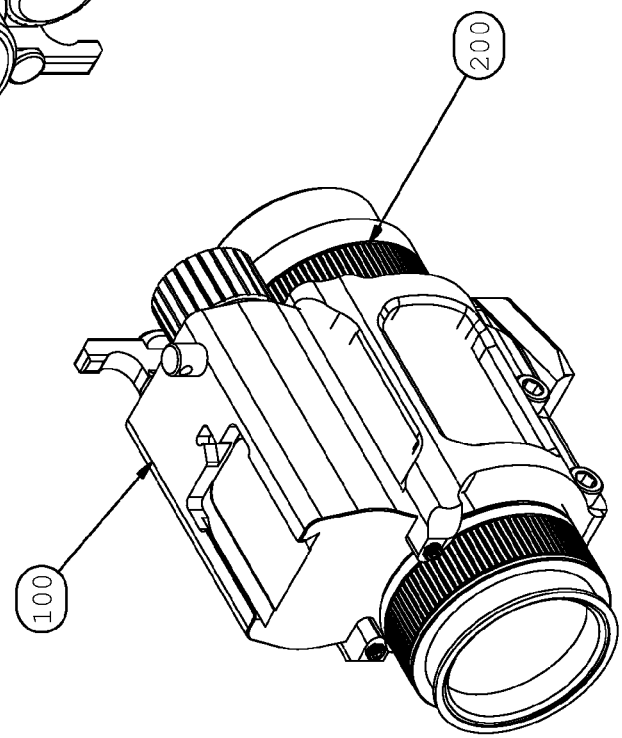
FIG. 6 is an isometric view of the weapon mount system and night vision monocular taken generally from the top and rear.
Figure 8:
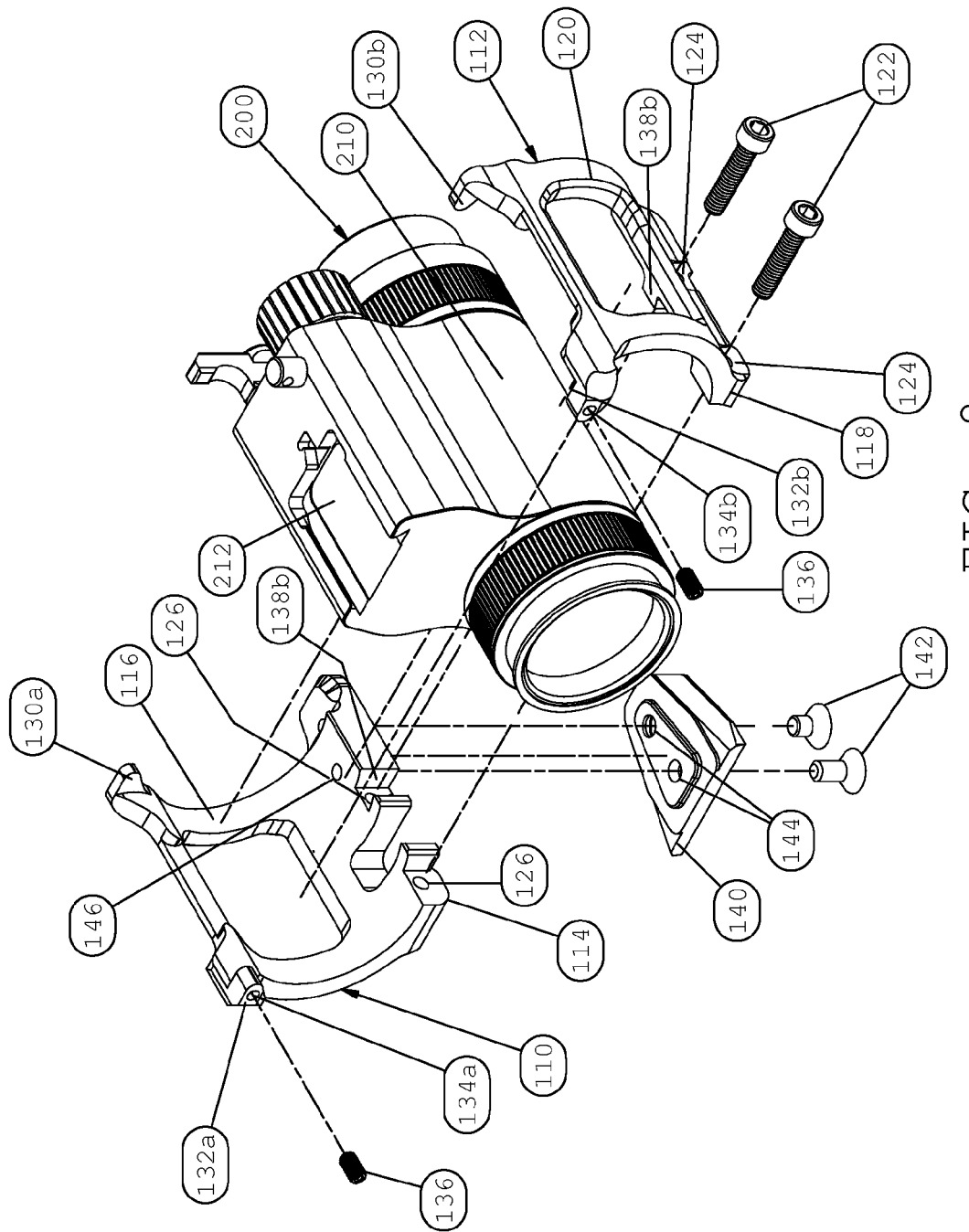
FIG. 8 is an exploded isometric view of the weapon mount system herein with the night vision monocular.

In an especially preferred embodiment, as shown in FIGS. 8 and 9, the clamp 400 includes a base 412 which is adapted for removable attachment to the accessory rail 510. The base 412 is attached via a hinge or pivot axis 414 to a pivoting member 416 having the shoe receptacle 410 thereon. In operation, the pivoting member 416 is pivoted to the closed or operative position, wherein the night vision system 100 is in alignment with the optical scope 600. When use of the night vision system is not desired, the pivot member 416 is pivoted to the open position or non-operative about the hinge 414 and out of the user's line of sight to allow the user to look directly through the scope 600 without the need to remove the night vision system 100 with night vision device 200 from the rail clamp 400.

The adapter system 100 in accordance with the present disclosure also advantageously provides additional mounting options for helmet mounting. For example, FIG. 12 illustrates a helmet mounted monocular system employing a single night vision device 200 with the helmet mount 300, which may be as described in commonly owned U.S. application Ser. No. 13/630,695 filed Sep. 28, 2012, the entire contents of which are incorporated herein by reference. As described above, the device 200 is attached to the mount 300 using the preexisting mounting fastener 212, wherein the system 100 may be left in place and does not interfere with the helmet mounting.

Referring now to FIG. 13, there is shown a helmet mounted binocular night vision system employing two night vision devices 200 and the helmet mount 310. The helmet mount 310 may be as described in commonly owned U.S. application Ser. No. 14/242,303 filed Apr. 1, 2014, the entire contents of which are incorporated herein by reference. In the depicted exemplary embodiment of FIG. 13, the night vision devices 200 are attached to the helmet mount 310 using the mounting fasteners 140 on the adapters 100 instead of the preexisting fasteners 212. The configuration appearing in FIG. 13 is advantageous for a number of reasons. For example, the present system allows for use of the monocular devices 200 with a mount such as the mount 310 having a higher profile, e.g., wherein the higher profile of the mount and the higher profile of the preexisting fasteners 212 might suspend the devices 200 to far beneath the optical axis of the user's eyes. In addition, the fastener 140 on the adapter system 100 can be selected to accommodate a particular helmet mount, whereas, the preexisting fastener 212 on the night vision system housing is generally fixed.

Referring now to FIG. 14, there appears a binocular viewing system employing a night vision monocular 200 for one eye and an alternative viewing device 700, which may use an alternative viewing or imaging modality, for the other eye. The alternative viewing device 700 is depicted as a thermal camera, although other optical electro-optical viewing or imaging devices are contemplated. The night vision device 200 is attached to the helmet mount 310 using the fastener 140 on the cage system 100. In addition to ensuring compatibility with the mounting fastener on the mount 310, the present system 100 provides a lower profile between the mount 140 and the optical axis 214. Whereas the profile of preexisting fastener 212 on the night vision device 200 is too large for use in a binocular system with the alternative viewing device having a relatively low profile mount, the adapter system 100 has a low profile, i.e., based on the thickness of the bottom end portion defined by the members 114 and 118 to allow the optical axis on the night vision system 200 to be aligned in substantially the same horizontal plane as the optical axis of the alternative viewing device 700.

The invention has been described with reference to the preferred embodiments. Modifications and alterations will occur to others upon a reading and understanding of the preceding disclosure herein, whereby it is to be distinctly understood that the foregoing descriptive matter is to be interpreted merely as illustrative of the invention and not as a limitation.

What is claimed is:

1. A mounting apparatus for mounting a night vision system, the night vision system being of a type having an elongated housing and a first mounting fastener on the housing, the mounting apparatus comprising:

a first shell member having a first base portion and a first generally upstanding side portion;

a second shell member having a second base portion removably attached to the first base portion to define a bottom end and a second generally upstanding side portion which is spaced apart from and opposes the first generally upstanding side portion;

a second mounting fastener attached to an exterior surface of the bottom end;

the first shell member and the second shell member cooperating to define a compartment for receiving the elongated housing, the compartment having an open top opposite the bottom end, the open top configured to allow a protruding portion of the elongated housing having the first mounting fastener to protrude from the compartment; and a rail clamp assembly having a clamping member attached to a third mounting fastener, the clamping member configured to be removably attached to a firearm accessory rail and the third mounting fastener removably attachable to the second mounting fastener.

2. The mounting apparatus of claim 1, wherein the first mounting fastener is a mounting receptacle.

3. The mounting apparatus of claim 1, wherein the second mounting fastener is a mounting shoe.

4. The mounting apparatus of claim 3, wherein the mounting shoe has a generally dovetail shape.

5. The mounting apparatus of claim 1, further comprising one or more threaded fasteners for removably securing the first base portion to the second base portion.

6. The mounting apparatus of claim 1, wherein the first base portion and the second base portion each have a complementary keyed feature for interlocking the first base portion to the second base portion.

7. The mounting apparatus of claim 6, wherein the first base portion includes a protuberance which extends into a complementary recess on the second base portion.

8. The mounting apparatus of claim 1, further comprising:
a first front retention tab attached to a distal end of the first generally upstanding side portion and extending toward the second upstanding side portion;
a second front retention tab attached to a distal end of the second generally upstanding side portion and extending toward the first upstanding side portion;
a first rear retention tab attached to a distal end of the first generally upstanding side portion and extending toward the second upstanding side portion;
a second rear retention tab attached to a distal end of the second generally upstanding side portion and extending toward the first upstanding side portion;
the first front retention tab and the first rear retention tab disposed at opposite axial ends of the first generally upstanding side portion;
the second front retention tab and the second rear retention tab disposed at opposite axial ends of the second generally upstanding side portion;
the first front retention tab and the second front retention tab configured to bear against a forward facing surface of the protruding portion of the elongated housing;
the first rear retention tab and the second rear retention tab configured to bear against a rearward facing surface of the protruding portion of the elongated housing.

9. The mounting apparatus of claim 8, further comprising:
at least one of the first front retention tab and the first rear retention tab including a first set screw rotatably received within a first threaded opening; and
at least one of the second front retention tab and the second rear retention tab including a second set screw rotatably received within a second threaded opening.

10. The mounting apparatus of claim 1, wherein the rail clamp has a first height and the base portion has a second height, the first and second heights cooperating to position an optical axis of the night vision system at a desired height above the accessory rail when night vision system is received in compartment, when the second mounting fastener is attached to the third mounting fastener, and when the rail clamp is attached to the accessory rail.

11. The mounting apparatus of claim 10, further comprising the night vision system.

12. The mounting system of claim 10, wherein the night vision system is a MINI N/SEAS night vision monocular.

13. The mounting system of claim 11, wherein the protruding portion of the elongated housing has a third height which is greater than the desired height.

14. The mounting apparatus of claim 10, wherein the desired height is substantially equal to a fourth height, the fourth height equal to a height above the accessory rail of an optical axis of an optical device mounted to the accessory rail.

15. The mounting apparatus of claim 14, wherein the third mounting fastener is pivotally attached to the clamping member, the third mounting fastener pivotable between an operative position wherein the night vision system is in optical alignment with the optical device mounted to the accessory rail and a non-operative position wherein the night vision system is moved out of optical alignment with the optical device mounted to the accessory rail.

16. The mounting apparatus of claim 1, wherein the third mounting fastener is pivotally attached to the clamping member, the third mounting fastener pivotable between an operative position and a non-operative position.

17. The mounting apparatus of claim 1, wherein the second mounting fastener is configured to be attached to a helmet mount of a type configured to support the night vision system before an eye of a user.

18. The mounting apparatus of claim 17, wherein the base portion has a height selected to suspend the night vision system at a desired vertical position beneath the helmet mount.

19. The mounting apparatus of claim 18, wherein the height is selected so that an optical axis of the night vision system attached to the helmet mount will be at substantially the same vertical position beneath the helmet mount as an optical axis of an adjacent attached viewing device attached to the helmet mount.

20. The mounting apparatus of claim 18, wherein the adjacent attached viewing device is a thermal camera.

21. A mounting apparatus for mounting a night vision system, the night vision system being of a type having an elongated housing and a first mounting fastener on the housing, the mounting apparatus comprising:
a first shell member having a first base portion and a first generally upstanding side portion;
a second shell member having a second base portion removably attached to the first base portion to define a bottom end and a second generally upstanding side portion which is spaced apart from and opposes the first generally upstanding side portion;
a second mounting fastener attached to an exterior surface of the bottom end;
the first shell member and the second shell member cooperating to define a compartment for receiving the elongated housing, the compartment having an open top opposite the bottom end, the open top configured to allow a protruding portion of the elongated housing having the first mounting fastener to protrude from the compartment;
a first front retention tab attached to a distal end of the first generally upstanding side portion and extending toward the second upstanding side portion;

a second front retention tab attached to a distal end of the second generally upstanding side portion and extending toward the first upstanding side portion;
a first rear retention tab attached to a distal end of the first generally upstanding side portion and extending toward the second upstanding side portion;
a second rear retention tab attached to a distal end of the second generally upstanding side portion and extending toward the first upstanding side portion;
the first front retention tab and the first rear retention tab disposed at opposite axial ends of the first generally upstanding side portion;
the second front retention tab and the second rear retention tab disposed at opposite axial ends of the second generally upstanding side portion;
the first front retention tab and the second front retention tab configured to bear against a forward facing surface of the protruding portion of the elongated housing;
the first rear retention tab and the second rear retention tab configured to bear against a rearward facing surface of the protruding portion of the elongated housing.
a first front retention tab attached to a distal end of the first generally upstanding side portion and extending toward the second upstanding side portion;
a second front retention tab attached to a distal end of the second generally upstanding side portion and extending toward the first upstanding side portion;
a first rear retention tab attached to a distal end of the first generally upstanding side portion and extending toward the second upstanding side portion;
a second rear retention tab attached to a distal end of the second generally upstanding side portion and extending toward the first upstanding side portion;
the first front retention tab and the first rear retention tab disposed at opposite axial ends of the first generally upstanding side portion;
the second front retention tab and the second rear retention tab disposed at opposite axial ends of the second generally upstanding side portion;
the first front retention tab and the second front retention tab configured to bear against a forward facing surface of the protruding portion of the elongated housing; and
the first rear retention tab and the second rear retention tab configured to bear against a rearward facing surface of the protruding portion of the elongated housing.

22. The mounting apparatus of claim 21, further comprising:
at least one of the first front retention tab and the first rear retention tab including a first set screw rotatably received within a first threaded opening; and
at least one of the second front retention tab and the second rear retention tab including a second set screw rotatably received within a second threaded opening.

23. The mounting apparatus of claim 21, wherein the first mounting fastener is a mounting receptacle.

24. The mounting apparatus of claim 21, wherein the second mounting fastener is a mounting shoe.

25. The mounting apparatus of claim 24, wherein the mounting shoe has a generally dovetail shape.

26. The mounting apparatus of claim 21, further comprising one or more threaded fasteners for removably securing the first base portion to the second base portion.

27. The mounting apparatus of claim 21, wherein the first base portion and the second base portion each have a complementary keyed feature for interlocking the first base portion to the second base portion.

28. The mounting apparatus of claim 27, wherein the first base portion includes a protuberance which extends into a complementary recess on the second base portion.

29. The mounting apparatus of claim 1, wherein the second mounting fastener is configured to be attached to a helmet mount of a type configured to support the night vision system before an eye of a user.

30. The mounting apparatus of claim 29, wherein the base portion has a height selected to suspend the night vision system at a desired vertical position beneath the helmet mount.

31. The mounting apparatus of claim 30, wherein the height is selected so that an optical axis of the night vision system attached to the helmet mount will be at substantially the same vertical position beneath the helmet mount as an optical axis of an adjacent attached viewing device attached to the helmet mount.

32. The mounting apparatus of claim 30, wherein the adjacent attached viewing device is a thermal camera.

* * * * *